(12) United States Patent
Koenig et al.

(10) Patent No.: US 10,215,074 B2
(45) Date of Patent: Feb. 26, 2019

(54) SCR EXHAUST AFTERTREATMENT DEVICE

(71) Applicant: BENTELER AUTOMOBILTECHNIK GMBH, Paderborn (DE)

(72) Inventors: Tobias Koenig, Meschede (DE); Eugen Lewin, Paderborn (DE); Elmar Grussmann, Paderborn (DE); Frank Grumbrecht, Berlin (DE); Tobias Roemer, Goslar (DE); Anne Franzke, Chemnitz (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/412,849

(22) Filed: Jan. 23, 2017

(65) Prior Publication Data

US 2017/0211449 A1 Jul. 27, 2017

(30) Foreign Application Priority Data

Jan. 21, 2016 (DE) .................. 10 2016 101 055

(51) Int. Cl.
*F01N 3/00* (2006.01)
*F01N 3/10* (2006.01)
(Continued)

(52) U.S. Cl.
CPC ........ *F01N 3/2821* (2013.01); *B01F 3/04049* (2013.01); *B01F 5/0451* (2013.01);
(Continued)

(58) Field of Classification Search
CPC ...... F01N 3/2066; F01N 3/208; F01N 3/2821; F01N 1/086; F01N 1/088; F01N 1/12
(Continued)

(56) References Cited

U.S. PATENT DOCUMENTS

| 6,745,562 | B2* | 6/2004 | Berriman | ............ F01N 3/2892 |
| | | | | 181/225 |
| 2006/0075745 | A1* | 4/2006 | Cummings | ............ F01N 1/088 |
| | | | | 60/315 |

(Continued)

FOREIGN PATENT DOCUMENTS

| DE | 102007021598 | 11/2008 |
| DE | 102008017395 | 10/2009 |

(Continued)

*Primary Examiner* — Phutthiwat Wongwian
*Assistant Examiner* — Diem Tran
(74) *Attorney, Agent, or Firm* — Jacobson Holman, PLLC.

(57) ABSTRACT

An SCR exhaust aftertreatment device of an internal combustion engine, containing an injector for injecting a reductant, a mixing unit and an SCR catalytic converter disposed immediately downstream in the direction of exhaust flow, wherein the mixing unit exhibits a swirl element and an impact element positioned upstream of the swirl element in the direction of exhaust flow, whereby the swirl element is configured of two guide elements disposed inside one another and swirl vanes for creating a swirling motion are disposed in an inner guide element and swirl vanes, which create a counterswirling motion, are disposed between the inner guide element and the outer guide element.

8 Claims, 4 Drawing Sheets

(51) Int. Cl.
*F01N 3/28* (2006.01)
*F01N 3/20* (2006.01)
*B01F 5/04* (2006.01)
*B01F 5/06* (2006.01)
*B01F 3/04* (2006.01)

(52) U.S. Cl.
CPC .......... *B01F 5/0616* (2013.01); *F01N 3/2066* (2013.01); *F01N 3/2892* (2013.01); *B01F 2005/0639* (2013.01); *F01N 2240/20* (2013.01); *F01N 2610/02* (2013.01); *Y02T 10/24* (2013.01)

(58) Field of Classification Search
USPC .................................. 60/286, 301, 303, 324
See application file for complete search history.

(56) References Cited

U.S. PATENT DOCUMENTS

| | | | |
|---|---|---|---|
| 2007/0205523 A1* | 9/2007 | Kojima | B01D 53/18 261/79.2 |
| 2008/0060712 A1 | 3/2008 | Gluzman et al. | |
| 2008/0087013 A1* | 4/2008 | Crawley | F01N 3/0231 60/320 |
| 2008/0250776 A1* | 10/2008 | Brown | B01F 3/04049 60/299 |
| 2008/0295497 A1* | 12/2008 | Kornherr | B01D 53/90 60/286 |
| 2012/0204541 A1 | 8/2012 | Li et al. | |

FOREIGN PATENT DOCUMENTS

| | | |
|---|---|---|
| DE | 102008029110 | 12/2009 |
| DE | 102012002776 | 8/2012 |
| DE | 102011111765 | 2/2013 |
| DE | 102012111335 | 5/2013 |
| DE | 102012000597 | 7/2013 |
| DE | 102012224198 | 6/2014 |
| DE | 102014214093 | 5/2015 |
| DE | 102016102020 | 10/2016 |
| EP | 2535535 | 12/2012 |
| WO | WO 2012/089290 | 7/2012 |

* cited by examiner

SCR EXHAUST AFTERTREATMENT DEVICE

BACKGROUND OF THE INVENTION

The present invention concerns an SCR (selective catalytic reduction) exhaust aftertreatment device for an internal combustion engine in accordance with the features in the preamble of claim 1.

In motor vehicles, internal combustion engines are used to convert the chemical energy contained in fuel into mechanical energy to power the motor vehicle via the combustion process. In the process, due to the ideal Carnot cycle, about 40% of the energy contained in the fuel is converted to mechanical energy. The rest of the energy contained in the fuel is converted to heat, and exhaust gases arise as a result of the combustion process. Among other things, these exhaust gases contain nitrogen oxides (NO, NO2).

In recent years, in particular also in automotive manufacturing, Selective Catalytic Reduction (SCR), in which a reductant is added to the exhaust and nitrogen oxides are selectively reduced and undesired side reactions such as the oxidation of sulfur dioxide to sulfur trioxide are suppressed, has established itself in the state of the art.

Ammonia is typically used as the reductant. In automotive engineering this is supplied in the form of an aqueous urea solution and is known, among other things, under the registered trademark AdBlue. One objective in particular is the reduction of nitrogen oxide emissions in diesel engines by means of Selective Catalytic Reduction, which is also referred to as urea injection.

The reductant added to the exhaust stream has to be mixed with the exhaust stream. The reductant itself is often injected into the exhaust stream with an injector. Typical injectors generate pronounced filament jets with relatively large and stable individual droplets.

To now achieve good mixing of the exhaust stream and the injected reductant, mixer elements, which create a swirl to bring about relative motion between the exhaust stream and the reductant, are known from the state of the art. This in particular extends the droplet trajectory of the injected reductant, thus increasing the evaporation tendency and resulting in better mixing.

A mixing unit, in which a first swirl component is followed by a downstream counterswirl component, is known from DE 10 2012 224 198 A1 for example. At the same time, this also increases the exhaust gas back pressure. This elevation of the exhaust gas back pressure is undesirable, however, because it has a negative effect on the efficiency of the internal combustion engine.

After the exhaust stream is mixed with the reductant, the exhaust stream enters a downstream SCR catalytic converter. In most cases an additional oxidation catalyst is positioned upstream of the location at which the reductant is injected into the exhaust stream.

BRIEF SUMMARY OF THE INVENTION

The task of the present invention is to provide an SCR exhaust aftertreatment device based on the state of the art, which exhibits low exhaust gas back pressure while at the same time providing particularly good mixing of the exhaust stream and the reductant with cost-effective manufacturing and minimal constructional effort.

The aforementioned task is inventively solved with an SCR exhaust aftertreatment device having the features in claim 1.

Advantageous design variants are described in the dependent claims.

The inventive SCR exhaust aftertreatment device of an internal combustion engine exhibits an injector for injecting a reductant, as well as a mixing unit and a catalytic converter disposed downstream in the direction of exhaust flow, in particular a SCR catalytic converter, wherein the mixing unit exhibits a swirl element and a separate impact element positioned upstream in the direction of exhaust flow. The swirl element is configured of two guide elements disposed inside one another, whereby swirl vanes for creating a swirling motion are disposed in an inner guide element and swirl vanes, which create a counterswirling motion, are disposed between the inner guide element and the outer guide element.

The constructive uncoupling of the mechanical spray breakup function and the swirl generation is thus implemented. On the other hand, however, the integration of the swirl element and the impact element in a mixing unit or in a mixer component ensures favorable manufacturing and simple integration in the exhaust system.

Due to the fact that the impact element is configured separately, it can nonetheless be connected to the swirl element and it is possible to optimally design the impact element to match the specification of the injector and in particular the shape of the jet of the reductant, so that the spray breakup function is adequately fulfilled across a wide operating range of the internal combustion engine.

By changing the design parameters, in particular of the swirl vanes, the swirl generation function can thus be adapted to the requirements of the geometry downstream in the direction of exhaust flow independently of the spray breakup function.

The inventive approach of simultaneously, with respect to the direction of flow, creating a swirling motion for one partial stream of the exhaust and creating a counterswirling motion for the remaining partial stream of the exhaust, results in especially good mixing of exhaust and reductant in an entrance funnel of a catalytic converter that, viewed in the direction of flow, is short. This creates uniform and good mixing of the exhaust stream and in particular vaporized reductant, so that, upon entry into the monolith of a catalytic converter, it is optimally mixed for the exhaust aftertreatment taking place therein. To do this, the inventive intent is for the entire exhaust stream to pass through the swirl element. The guide elements of the swirl element are preferably configured as bushings. One part of the exhaust stream passes through the inner bushing, and the remaining part passes through the space between the inner bushing and the outer bushing. The swirling motion and the counterswirling motion are thus not created consecutively for the entire exhaust stream, but rather substantially simultaneously, each for one particular part of the exhaust stream.

After the exhaust stream and the reductant pass through the swirl element, the swirling motion and the counterswirling motion provide for additional turbulence and thus for better mixing. For this purpose, the swirl vanes for creating the swirling motion and the swirl vanes for creating the counterswirling motion are arranged at substantially the same height and/or next to one another with respect to the direction of exhaust flow. This means that the exhaust stream that passes through the swirl vanes to create the swirling motion performs this action at approximately the same time as that at which the other part flows through the swirl element to create the counterswirling motion. Therefore, the swirling motion and the counterswirling motion are not created consecutively or successively, and preferably not for the entire exhaust stream at once. In the sense of the invention, "same height" is also to be understood as meaning an offset, between the swirl vanes creating the swirling motion and the swirl vanes creating the counterswirling motion, of only a few millimeters in the axial direction of the swirl element.

The swirl element itself is preferably configured to be opaque in the direction of exhaust flow. This means that, when viewing the swirl element in its axial direction, there are no visible openings for the exhaust to pass through. Due to the angular position of the swirl vanes, openings are visible only when viewing at an angle.

The entirety of the exhaust flowing through the exhaust aftertreatment device therefore flows through the swirl element. One part of the exhaust stream flows through the inner guide element, preferably the inner bushing, and the remaining part passes through the space between the inner guide element and the outer guide element, preferably the outer bushing. The inner guide element, in particular the inner bushing, is preferably arranged concentrically within the outer guide element, in particular the outer bushing. It can, however, also be arranged within the outer guide element in an eccentrically offset manner. The cross section of the bushings can be round, but also oval or some other shape.

With respect to the direction of exhaust flow, the impact element is arranged upstream of the swirl element. The impact element is in particular disposed on an axial axis with the swirl element. The impact element is preferably configured as a sheet metal component, in particular as a sheet metal forming part, most preferably as a sheet metal forming part in one piece and in a material uniform manner. The impact element can be indirectly coupled to the swirl element. Preferably, however, the impact element is directly coupled with the swirl element. The impact element is in particular snapped on to the swirl element and preferably additionally firmly bonded with the swirl element.

The impact element particularly preferably exhibits at least two baffles, preferably three baffles. The number of baffles is, however, in particular determined by the number of injection jets of the injectant injected into the injector. If 4, 5 or 6 injection jets are injected, for example, there are therefore preferably also 4, 5 or 6 baffles. The baffles can also be referred to as impact plates.

The baffles are in particular arranged to be facing inward in radial direction with respect to one another and, with respect to the direction of exhaust flow, at an angle to the flow. The angle α is preferably configured individually for each baffle. It preferably lies between 30° and 60°, in particular between 35° and 55°, preferably between 40° and 50°. Therefore the injected jets hit the baffle, are broken up into smaller droplets, deflected in such a way that they disperse spreading out substantially in radial direction, and are then picked up by the exhaust stream.

To do this, the injector is preferably positioned upstream of the impact element in the axial direction of the swirl element, so that any injection jet hits the impact element substantially in the axial direction of the swirl element. This means that the injection jet is injected in an orientation parallel to the axial direction of the swirl element and proceeds in an oriented manner between injection and hitting the baffle. In the sense of the invention an angle smaller than 15°, in particular smaller than 7° and preferably smaller than 5°, to the axial direction is to be understood. The injection jet preferably proceeds with an angle of 0° to 5° to the axial direction of the swirl element.

The outer bushing of the swirl element is furthermore preferably used as a connecting element of an SCR catalytic converter with an exhaust pipe duct positioned upstream of the SCR catalytic converter; the swirl element is inserted into it. The outer bushing is configured as an inner connecting sleeve or connecting collar.

The invention further concerns a method for operating the SCR exhaust aftertreatment device according to the invention.

BRIEF DESCRIPTION OF THE DRAWINGS

Additional advantages, features, characteristics and aspects of the present invention are the subject matter of the following description. Preferred design variants are depicted in the schematic figures. They provide easy comprehension of the invention. The figures show.

DETAILED DESCRIPTION OF THE INVENTION

The same reference signs are used for the same or similar components in the figures, even if the description is not repeated for the sake of simplicity. The guide elements are described as bushings, but can have other geometric designs as well.

Figure 1:
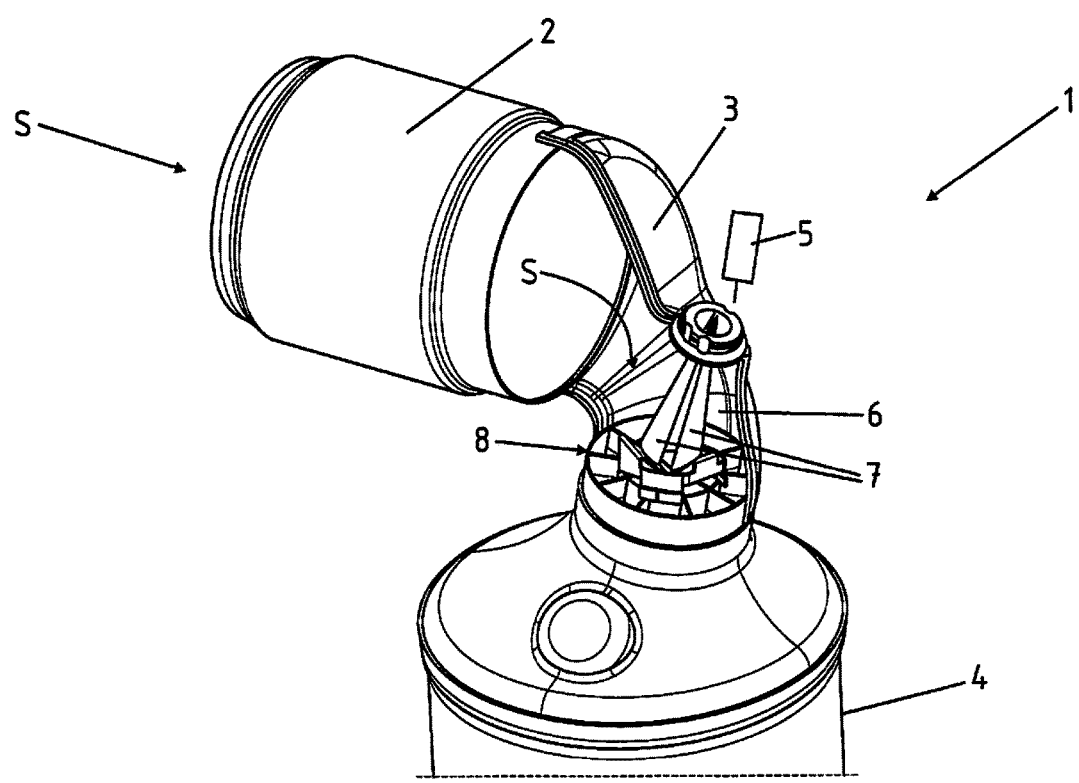
FIG. 1 is a perspective view of an SCR exhaust aftertreatment device.

FIG. 1 shows a perspective view of an SCR exhaust aftertreatment device 1. For this purpose a first component 2, for example an oxidation catalyst, is shown, which is followed in the direction of exhaust flow S by a connecting element 3, through which the exhaust flow passes. The connecting element 3 is followed by an SCR catalytic converter 4.

On the connecting element 3 there is an injector 5, which injects injection jets 7 of a reductant into the interior space 6 of the connecting element 3. A mixing unit 8, which is described in more detail in FIG. 2A to C and FIG. 3, is disposed in a passage from the connecting element 3 to the SCR catalytic converter 4.

The mixing unit 8 exhibits a swirl element 9 and an impact element 10. With respect to the direction of exhaust flow S, the impact element 10 is positioned upstream of the swirl element 9. The swirl element 9 exhibits an outer bushing 11 and an inner bushing 12 disposed therein. Swirl vanes 13, which create a counterswirling motion GD upon passage of one part of the exhaust stream 19, are arranged between the inner bushing 12 and the outer bushing 11. The counterswirling motion GD is opposite a swirling motion D created by the swirl vanes 14 disposed within the inner bushing 12. The swirling motion D is created upon passage of the other part of the exhaust stream through the inner bushing 12. The direction of the swirling motion D and the counterswirling motion GD can also be opposite to those shown in FIG. 2A.

The entire exhaust stream is thus fed through the mixing unit 8, because part of the exhaust stream 19 passes through the inner bushing 12 and the remaining part of the exhaust stream passes though the space between the inner bushing 12 and the outer bushing 11. In doing so, the part that passes through the inner bushing 12 is set into a swirling motion D by the swirl elements 14 in the inner bushing 12 and the other part, which passes through the outer bushing 11 at the same time, is set into an opposite counterswirling motion GD.

Figure 2A:
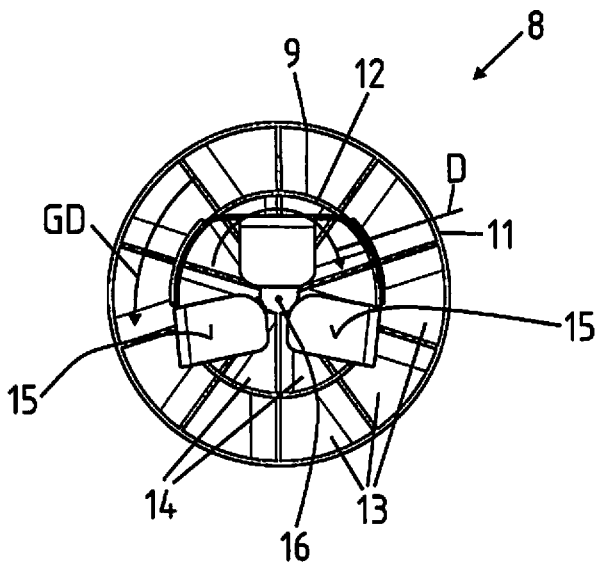
FIG. 2 consists of FIGS. 2A, 2B and 2C showing a mixing unit according to the invention.
Figure 2B:
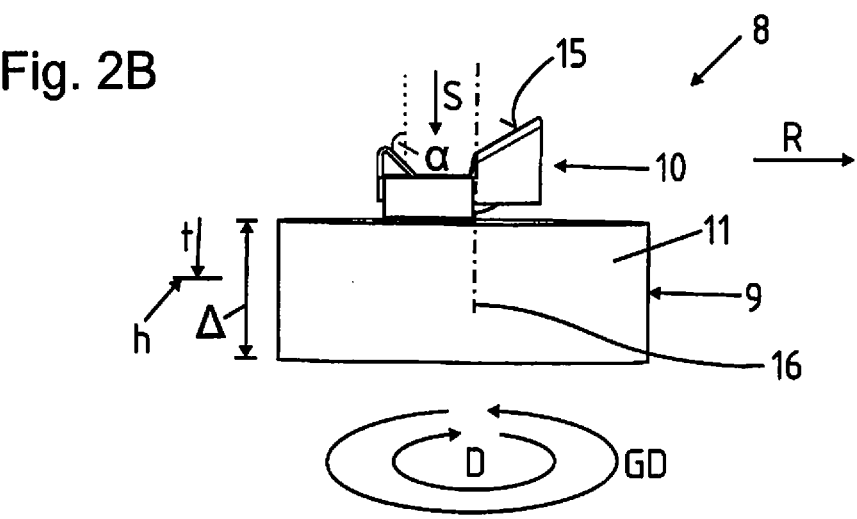

To improve the initial dispersion of the droplets of the respective injection jet 7, and with it also their vaporization in the exhaust stream, however, an impact element 10 is disposed upstream of the swirl element 9 in the direction of exhaust flow S. The impact element 10 has baffles 15; three baffles 15 are shown in the drawing. They correspond to the three depicted injection jets 7 of FIG. 1. Therefore, each injection jet 7 hits one baffle 15. The injection jets 7, which are not shown in more detail, proceed at a small angle, in particular oriented parallel to an axial direction 16 of the swirl element 9. The baffles 15 of the impact element 10 are oriented to face one another in radial direction R, as shown in FIG. 2A, and arranged at an angle α with respect to the direction of exhaust flow S, as shown in FIG. 2B. The reductant droplets that form upon impact are thus deflected in radial direction R and picked up by the exhaust flow in the cross-flow principle.

Figure 2C:
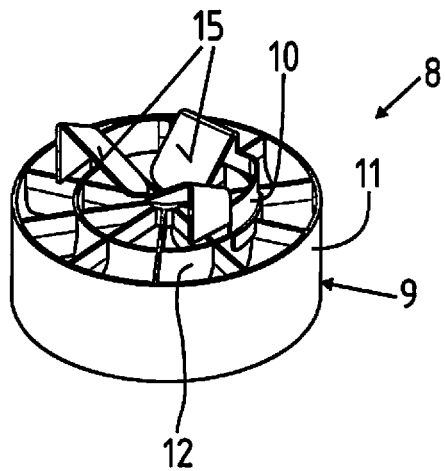
Figure 3:
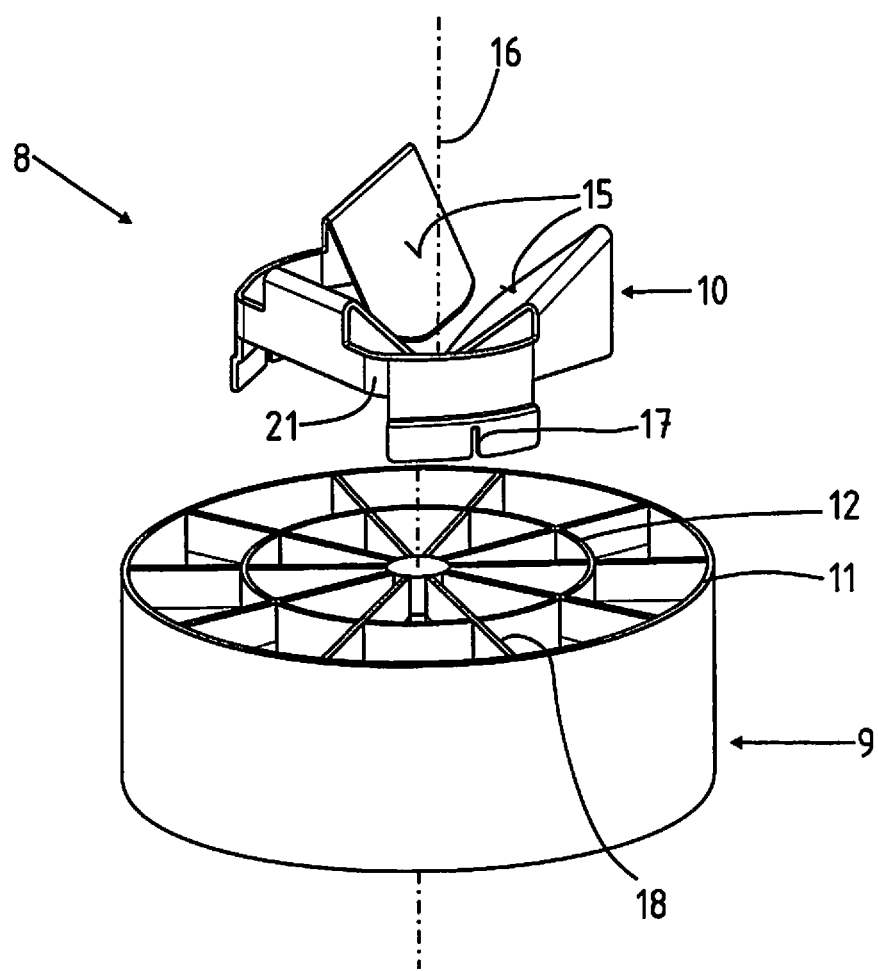
FIG. 3 is an exploded view of a mixing unit according to the invention.

The angle can be individually optimized for every baffle 15. FIG. 3 shows particularly well that the impact element 10 is manufactured as a sheet metal forming part in one piece and in a material uniform manner. This sheet metal forming part can exhibit insertion slots 17, for example, via which it can be set onto fins 18 disposed in the swirl element 9. The baffles 10 are, in particular integrally and in a material uniform manner, coupled to one another by a partially circumferential clip 21. The snapped on impact element 10 is shown in FIG. 2C. It can additionally be coupled to the swirl element 9 in a firmly bonded manner. There is, however, a functional separation of the initial breakup of the injection jet 7 on the impact element 10 and the subsequent mixing and vaporization in and after the swirl element 9, in each case with respect to the direction of exhaust flow S.

FIG. 2B again shows a time axis t or a reference sign h for the height. One part of the exhaust flowing through the swirl element 9 in the direction of exhaust flow S is thus set in swirling motion D, and the other part is set in counterswirling motion GD. This takes place at substantially the same time or at the same height h with respect to the direction of exhaust flow S. A small offset with respect to time and/or height h upstream or downstream is shown as Δ, and represents the concept of the invention. It is again evident here that not at least one part, in particular the entire exhaust stream, is first set in a swirling motion D and then in a counterswirling motion GD, but rather that both take place at the same time.

Figure 4:
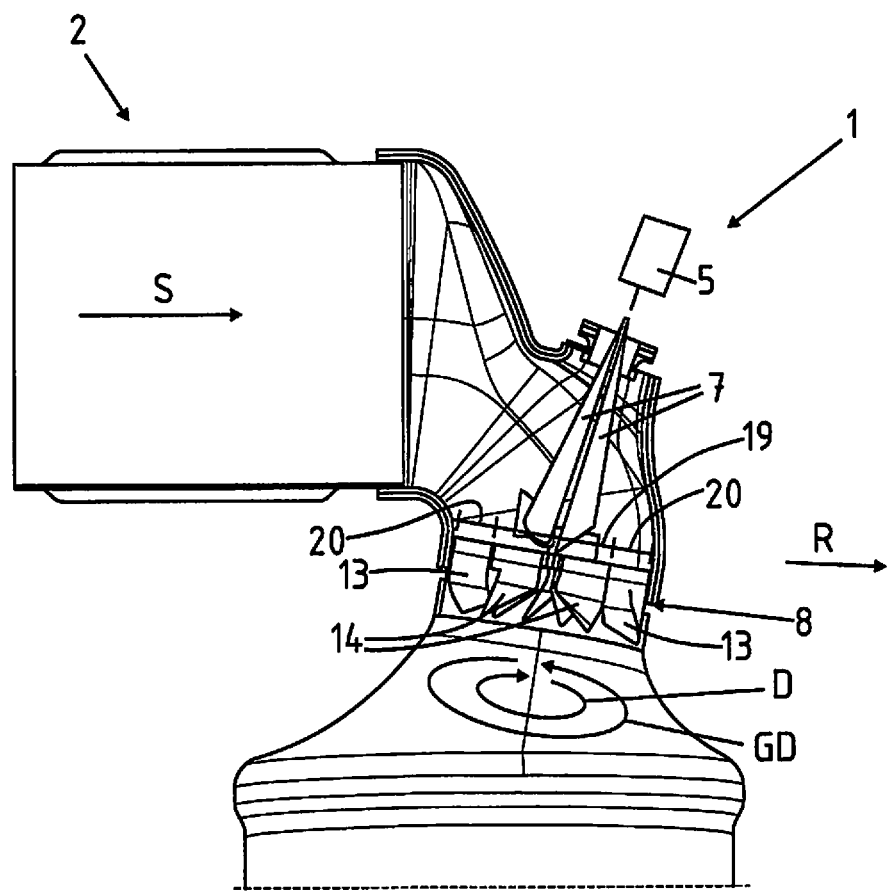
FIG. 4 is a sectional view of the SCR exhaust aftertreatment device of FIG. 1.

This is also shown again in FIG. 4. FIG. 4 shows a cross-sectional view through the SCR exhaust aftertreatment device 1 according to the invention, in which one part of the exhaust stream 19 flows through the inner bushing 12 of the swirl element 9 and the other part 20 flows between the inner bushing 12 and the outer bushing 11 through the mixing unit 8. Therefore, with respect to the direction of exhaust flow S, the entire exhaust stream 19, 20 is set simultaneously in swirling motion D and in counterswirling motion GD, which results in increased turbulence with respect to the direction of exhaust flow S downstream of the mixing unit 8, and thus in improved mixing and vaporization of the exhaust stream and the reductant.

REFERENCE SYMBOLS

1—SCR exhaust aftertreatment device
2—First component
3—Connecting element
4—SCR catalytic converter
5—Injector
6—Interior space of 3
7—Injection jets
8—Mixing unit
9—Swirl element
10—Impact element
11—Outer bushing
12—Inner bushing
13—Swirl vanes in 11
14—Swirl vanes in 12
15—Baffle
16—Axial direction to 9
17—Insertion slot
18—Fins
19—Part of the exhaust stream
20—Other part of the exhaust stream
21—Clip
D—Swirling motion
GD—Counterswirling motion
R—Radial direction
S—Direction of exhaust flow
t—Time axis
h—Height
Δ—Offset

The invention claimed is:

1. An SCR exhaust aftertreatment device of an internal combustion engine, containing an injector for injecting a reductant, a mixing unit and an SCR catalytic converter disposed immediately downstream in the direction of exhaust flow, wherein the mixing unit contains a swirl element and an impact element positioned upstream of the swirl element in the direction of exhaust flow, whereby the swirl element is configured of two guide elements disposed inside one another and swirl vanes for creating a swirling motion are disposed in an inner guide element and swirl vanes, which create a counterswirling motion, are disposed between the inner guide element and the outer guide element; and wherein the impact element has at least two baffles, is directly connected to and firmly bonded to the swirl element, and the baffles are arranged to face one another in a radial direction and angled in the direction of exhaust flow.

2. The SCR exhaust aftertreatment device according to claim 1, wherein the guide elements are configured as an inner bushing and an outer bushing.

3. The SCR exhaust aftertreatment device according to claim 1, wherein the swirl vanes for creating the swirling motion and the swirl vanes for creating the counterswirling motion are arranged at the same height and/or next to one another with respect to the direction of exhaust flow.

4. The SCR exhaust aftertreatment device according to claim 1, wherein the swirl element is configured to be opaque in the direction of exhaust flow and/or that the swirl element is configured in one piece and in a material uniform manner.

5. The SCR exhaust aftertreatment device according to claim 1, wherein the entirety of the exhaust flowing through the exhaust aftertreatment device flows through the swirl element.

6. The SCR exhaust aftertreatment device according to claim 1, wherein the impact element is configured as a sheet metal component, in particular a sheet metal formed part.

7. The SCR exhaust aftertreatment device according to claim 1, wherein the injector is positioned upstream of the impact element in axial direction of the swirl element, so that an injection jet is oriented and hits the impact element in an axial direction of the swirl element.

8. The SCR exhaust aftertreatment device according to claim 1, wherein the outer bushing of the swirl element is used as a connecting element of an SCR catalytic converter with an exhaust pipe duct positioned upstream of the SCR catalytic converter; the swirl element is inserted into it.

* * * * *